United States Patent [19]

Utzt

[11] Patent Number: 5,016,179

[45] Date of Patent: May 14, 1991

[54] DRIVE SLIP REGULATOR FOR MOTOR VEHICLES

[75] Inventor: Alfred Utzt, Fürstenfeldbruck, Fed. Rep. of Germany

[73] Assignee: Knorr-Bremse AG, Munich, Fed. Rep. of Germany

[21] Appl. No.: 379,384

[22] Filed: Jul. 13, 1989

[30] Foreign Application Priority Data

Jul. 13, 1988 [DE] Fed. Rep. of Germany ....... 3823686

[51] Int. Cl.$^5$ .............................................. B60T 8/58
[52] U.S. Cl. ........................... 364/426.02; 364/426.03; 180/197; 303/96; 303/103
[58] Field of Search ....................... 364/426.01, 426.02, 364/426.03; 180/197; 303/95–97, 103

[56] References Cited

U.S. PATENT DOCUMENTS

| 3,848,851 | 7/1989 | Kuraoka et al. | 364/426.01 |
| 4,657,313 | 4/1987 | Fennel et al. | 303/96 |
| 4,750,125 | 6/1988 | Leppek et al. | 364/426.03 |
| 4,844,556 | 7/1989 | Fennel et al. | 364/426.01 |
| 4,844,557 | 7/1989 | Giers | 364/426.02 |
| 4,849,891 | 7/1989 | Krohn et al. | 364/426.03 |
| 4,852,009 | 7/1989 | Jonner et al. | 303/97 |

Primary Examiner—Gary Chin
Attorney, Agent, or Firm—Pollock, Vande Sande & Priddy

[57] ABSTRACT

The drive slip regulator with which the slip of the driven wheels of a vehicle is limited to a fixed, predetermined value, forms a signal for the reference velocity $v_{Ref}$ from the mean value of the wheel velocities of the two non-driven wheels less a corrective value which takes into account the absolute value of the velocity difference of the two non-driven wheels and a corrective factor (k), which takes into account the wheel base.

5 Claims, 2 Drawing Sheets

DRIVE SLIP REGULATOR FOR MOTOR VEHICLES

FIELD OF THE INVENTION

The invention relates to a drive slip regulator for motor vehicles.

BACKGROUND OF THE INVENTION

Such drive slip regulators are in general well known and today can also be obtained commercially. Basically this drive slip regulator works in such a manner that the slip (i.e., the difference between vehicle velocity and wheel circumference velocity in terms of vehicle velocity) is regulated, a slip in the range of ca. 3% to 4% generally being permitted. If the slip is larger, drive performance is decreased and/or the driven wheel is braked by the excessive slip.

Determining the actual vehicle velocity, however, involves problems. For the first estimate, vehicle velocity is fairly well rendered by the non-driven vehicle wheels, assuming, of course, that these are turning freely and are not being braked. Vehicle velocity can be determined fairly well when the vehicle is being driven straight ahead, but not when passing through a curve, since the curve interior and curve exterior wheel circumference velocities can differ significantly from each other, depending on the turn radius. If, as is the practice with many vehicles, a diagonal division is chosen, such that for driven rear-axles the left front wheel delivers the reference velocity for the right rear wheel and the right front wheel the reference velocity for the left rear wheel, this can lead to significant errors because an excessive vehicle velocity (wheel velocity of the curve-exterior front wheel) is simulated especially for the curve-interior rear wheel.

SUMMARY OF THE INVENTION

An object of the invention is to improve the drive slip regulation so that it works more accurately.

Briefly, the invention is initially used to examine whether possible differences in revolutions between the left and right reference wheels are caused by driving through a curve or by other causes, especially by the use of an anti-lock system regulator. If the test determines that differences in revolutions between non-driven wheels of an axle are not caused by driving through a curve (that is, for example, by ABS regulation), then the drive slip regulator is not activated. If the reference velocity is derived from the non-driven wheels, drive slip regulation can only be initiated if there is no difference in revolutions between these wheels (drive path straight ahead) or if the vehicle is driven through a curve.

Moreover, according to the invention the reference value for determining vehicle velocity is determined in a special manner, namely, from the mean value of the revolutions, i.e., from the wheel circumference velocities of the two non-driven wheels of an axle. This eliminates errors influenced by a curved path, since the arithmetic mean value corresponds in practise to the velocity that a non-driven wheel would have if it were located exactly in the center between the two wheels.

According to one embodiment of the invention, the curve radius is also taken into account in determining the reference value. The difference in revolutions between the left and right wheel is of course larger for tight turns than it is for gradual turns with a larger radius of curvature.

Another embodiment also takes the length of the vehicle into account. For vehicles with very long wheel bases, the rear wheels of course "cut" the turns relatively sharply so that a slip regulation based on the reference value would be in error.

According to a further embodiment, an empirically determined, especially desirable correction factor provides that the reference velocity can be independent of the direction of the turn (left or right).

At this point it should also be mentioned that the reference value for the vehicle velocity during a turn can be completely different from the actual vehicle velocity (based on the center of the vehicle). This value is chosen intentionally, since by changing the reference velocity with respect to the actual vehicle velocity, the effect of adjusting the variables is achieved. This provides the great advantage that only one value, namely the reference velocity, need be changed, rather than a number of variables, so that the invention even reduce the construction costs, and, if a microprocessor is used, the programming costs as well.

BRIEF DESCRIPTION OF THE DRAWINGS

In order that the invention may be more clearly understood, reference will now be made to the accompanying drawings.

DESCRIPTION OF PREFERRED EMBODIMENT

Figure 1:
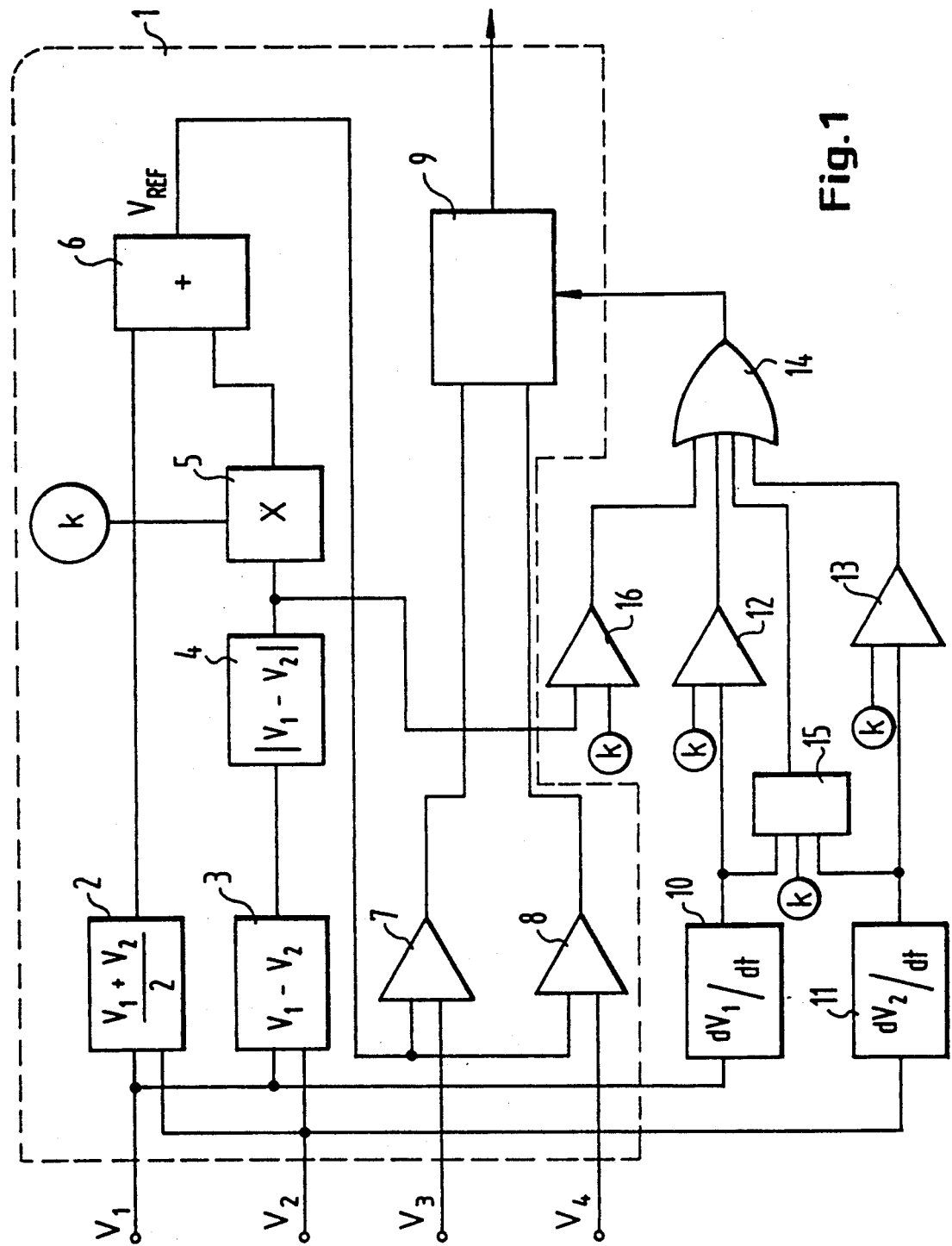
FIG. 1 is a basic circuit diagram of the drive slip regulator according to the invention; and, FIG. 2 is a diagram of the rotations of the right and left front wheels of a vehicle with a non-driven front axle during drive slip regulator braking and while turning.

The following discussion relates to a two-axle motor vehicle with four wheels, the rear axle being driven and the front axle being non-driven. Thus, any reference to the front wheels means the non-driven wheels. For vehicles with front-wheel drive, the expressions should be analogously reversed.

The drive slip regulator has four measurement inputs to which measurement signals for the four wheels are directed; the signals correspond to the wheel circumference velocity of the respective wheel Signal $v_1$ refers to the wheel circumference velocity of the left front wheel, $v_2$ to that of the right front wheel, $v_3$ to that of the left rear wheel, and $v_4$ to that of the right rear wheel. The arithmetical mean value $(v_1+v_2)/2$ is calculated in a first computation 2. The difference $v_1-v_2$ is calculated in a second computation 3. The absolute value of the output signal of the computation 3 is calculated in a third computation 4. The output signal of the computation 4 is multiplied by a constant factor k in a fourth computation 5. The output signals of computations 2 and 5 are added in a fifth computation 6. The output signal of computation 6 represents the reference velocity $v_{Ref}$, which satisfies the following condition:

$$v_{Ref} = \frac{v_1 + v_2}{2} + k|v_1 - v_2|$$

The signals $v_3$ and $v_4$ are compared to the reference value $v_{Ref}$ in two comparators 7 and 8, whereby signals $s_3$ and $s_4$ are obtained, which are proportional to the slip of the left or right rear wheel (with respect to $v_{Ref}$)

These signals are transmitted to a controller 9, which, depending on the values of the slip, regulates the drive performance and/or brakes so that a maximum permissible slip of, for example, 3% to 4%, is not exceeded. The thresholds for this slip are fixed in advance and need not be changed, since the reference value $v_{Ref}$ itself changes as a function of the radius of the turn.

As already mentioned, the corrective factor k, which is transmitted to the input of the multiplier 5, is likewise constant and primary from the wheel base, i.e., dependent on the distance between the front and rear wheels. This factor is negative, so that the reference value $v_{Ref}$ when turning is always smaller than the arithmetic mean value of the velocities of the two front wheels. The result is that, when turning, the permissible slip of the rear wheels becomes smaller, so that when turning there are more reserves of the coefficient of adhesion for lateral stability.

As already mentioned, the drive slip regulator must not be active if an anti-lock system is operative. Since with an anti-lock system velocity differences between left and right front wheel can also occur, care must be taken that the three possible operating conditions, "driving straight ahead", "turning", and "anti-lock regulation", can be differentiated. Driving straight ahead is recognized because the difference in velocity between the two front wheels is exactly zero. This case, then, is not problematic. But such differences in velocity can occur both during anti-lock regulation as well as when turning. Because of the following criteria, however, these two operating conditions can be differentiated. A turn is occurring if the following criteria are cumulatively fulfilled:

1. The revolutions of the front wheels must not be significantly different from one another to an unlimited extent. Fixed as the limit is a value which is just above the difference in velocities which actually occurs when turning, the maximum possible steering lock angle having to be taken into account. In practice, the value limit is fixed at about 2 m/s.
2. Acceleration rates of both front wheels likewise must differ from each other by only a small amount. The limit value depends primarily on possible interference signals which may occur as a result of the numerical differences of the sensor signals. Otherwise, the accelerations of the wheel circumference velocity which occur at the beginning and at the end of a turn are very slight.
3. Both accelerations of the two front wheels must also not exceed limiting values determined for each. The maximum and minimum values are determined by the maximum achievable vehicle acceleration or by the maximum achievable deceleration when braking, and here, as well, the influence of possible disturbances must be taken into account.

Mere fulfillment of the above conditions, however, is not yet enough for assured recognition of differences in revolutions caused by turning, since all of the conditions could also be fulfilled for a short period during ABS braking. Therefore, all three conditions must be met over a given time period for certain recognition. Practical tests show that a limit of little more than 1 sec. is sufficient. A value of 1.2 sec. has proven to be desirable.

Figure 2:
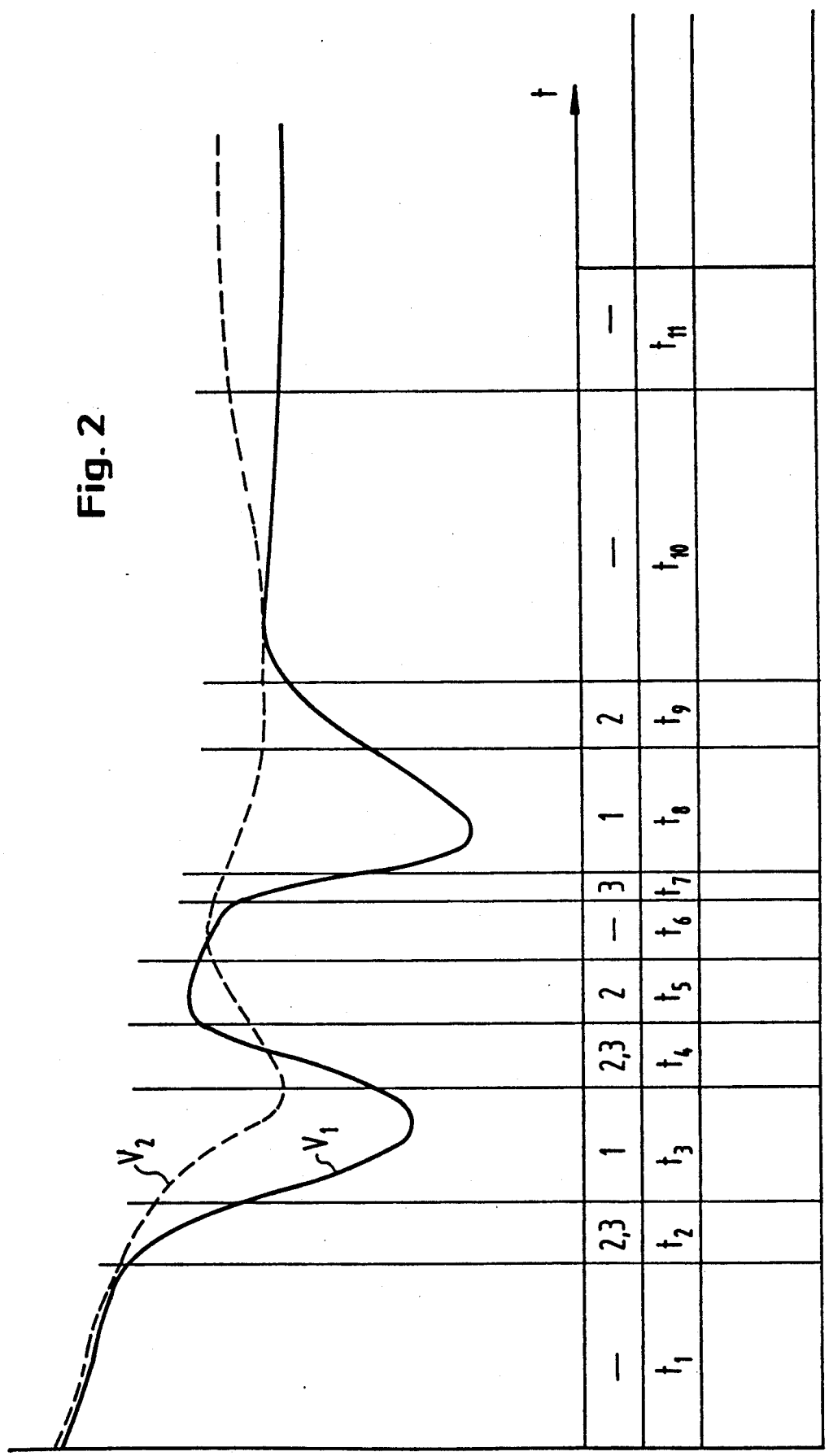

For clarification of these criteria, reference is made to FIG. 2. The dotted line $v_2$ shows the velocity of the right front wheel, while the solid line $v_1$ shows that of the left front wheel. Anti-lock braking occurs during a time interval of $t_1$ to $t_{10}$. In each of the time intervals $t_2$, $t_3$, $t_4$, $t_5$, $t_6$, $t_7$, $t_8$, and $t_9$, at least one of the three above-named criteria is not met, so that ABS braking is recognized with certainty. For example, in time interval $t_2$ the wheel accelerations of both wheels (downward slope of the curves) is below a limiting value (criteria 3) and additionally the difference in wheel accelerations between the two front wheels is larger than a predetermined value (criterion 2).

On the other hand, in time interval $t_3$ the difference in revolutions between the two front wheels is greater than a predetermined value (criteria 1). FIG. 2 shows which of the criteria is not met.

In the time intervals $t_6$ and $t_{10}$, none of the three criteria is not met, although there is ABS braking and no turn. This is where the fourth criterion takes effect, according to which there is certainty of a turn if none of the first three criteria is not met for a period of more than ca. 1.2 seconds. Given this, the drive slip regulator is blocked even in the time intervals $t_6$ and $t_{10}$. In the time intervals $t_1$ and $t_{11}$, however, all four criteria are met, so that in these time intervals drive slip regulation is permitted.

In terms of hardware, the recognition switch for ABS braking is recognized through the following features:

The wheel accelerations of the two front wheels are determined in two differentiators 10 and 11. Their output signals are compared in comparators 12 and 13 with two predetermined thresholds value, this comparison being conducted once for a maximum value and once for a minimum value. If the output signals of differentiator 10 or 11 exceed the threshold value, the comparator 12 or 13 give an output signal through which it is recognized that criterion 3 has not been met.

The output signals of the two differentiators 10 and 11 are subtracted from each other in a subtractor 15 and simultaneously the absolute value of the difference is formed. This absolute value is then compared to a threshold value. If the absolute value of the difference is greater than a predetermined threshold, then criterium number 2 has not been met.

Finally, the output signal of computation 4 is compared to a fixed, predetermined threshold value in a comparator 16. If the output signal of computation 3 is greater than this threshold value, comparator 16 is activated, which indicates that criteria 1 has not been met. The output signals of comparators 12, 13, 15 and 16 can be collected through an OR gate 14 and led into an input control in the controller, the controller for drive slip adjustment being blocked if the output of the OR gate 14 drives a signal.

Finally, it must also be mentioned that the multiplication value k (multiplier 5) is dependent not only on the wheel base but also on the steering behavior of the rear wheels. Many current rear axle constructions allow a certain degree of steering in the rear wheels during turns. It is therefore useful to define k empirically. Test results show that for vehicles of average length and normal rear wheel steering behavior, k is about 0.7. If this value is set at 0.5, this would just correspond to the case that the front wheel on one side would be selected for the reference velocity of the rear wheel on the same side. In certain cases, however, the value of k may also be greater than 1.

What is claimed is:
1. Drive slip regulator for vehicles having a motor and rotational speed sensors for two driven wheels and two non-driven wheels of said vehicles, comprising

(a) the speed sensors of said two non-driven wheels connected to a first computation unit, which forms an arithmetic means value of output signals of said speed sensors of said two non-driven wheels;

(b) a subtractor forming a differential value of input signals of said speed sensors of said non-driven wheels;

(c) a second computation unit forming an absolute value of an input signal thereof connected to an output of said subtractor;

(d) a first multiplier multiplying said absolute value from said second computation unit by a first constant value;

(e) an output of said first multiplier and an output of said first computation unit being connected with two inputs of an adder, which forms a reference value signal;

(f) an output of said adder connected with an input of each of a first and a second comparator;

(g) a further input of each of said first and second comparators respectively connected with said speed sensors of said driven wheels;

(h) outputs of said first and second comparators each connected with an input of a controller;

(i) said speed sensors of said non-driven wheels each being connected to an input of a corresponding differentiator;

(j) output of each said differentiator respectively being connected with the corresponding first input of the third and fourth comparators, second input of said third and fourth comparators each being connected to a second constant value;

(k) said absolute value of said second computation unit being connected to a fifth comparator having a further input connected to a third constant value;

(l) said outputs of said differentiators being respectively connected to the first and second inputs of a second subtractor, the third input of said second subtractor being connected to a fourth constant value;

(m) the outputs of said third, fourth and fifth comparators and an output of said second subtractor being connected with inputs of an OR-gate;

(n) an output of said OR-gate being connected to a control input of said controller;

(o) said controller being in inoperative condition when said output of said OR-gate carries a signal; and (p) an output signal of said controller diminishing driven force of said motor causing braking of said driven wheels.

2. Drive slip regulator according to claim 1, wherein the reference value signal is modified by a corrective factor proportional to a difference in revolution of the two non-driven wheels, and by an additional negative corrective factor in a range between 0.5 and 1 which takes into account the influence of a wheel base of said motor vehicle.

3. Drive slip regulator according to claim 2, wherein the additional correction factor is in a range between 0.7 and 0.8.

4. Drive slip regulator according to claim 1, wherein said controller of said driven slip regulator is activated only if the following conditions are cumulatively satisfied:

(a) said fifth comparator determines that an absolute amount of the revolution difference of the two non-driven wheels is below a fixed, predetermined value;

(b) said second subtractor determines that an absolute amount of the difference of the wheel accelerations of the two non-driven wheels is below a fixed predetermined threshold;

(c) each of said third and fourth comparator means determines that a corresponding absolute amount of the wheel acceleration of each said non-driven wheel is below a predetermined limiting value; and (d) a timer element determines that said conditions (a), (b) and (c) are present for between 1 and 2 seconds.

5. Drive slip regulator according to claim 1, wherein said conditions (a), (b) and (c) are present for 1.2 seconds.

* * * * *